United States Patent
Jia (10) Patent No.: US 12,135,071 B2
(45) Date of Patent: Nov. 5, 2024

(54) FOLDABLE APPARATUS AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 229 days.

(21) Appl. No.: 17/843,126

(22) Filed: Jun. 17, 2022

(65) Prior Publication Data

US 2022/0316559 A1 Oct. 6, 2022

Related U.S. Application Data

(63) Continuation of application No. PCT/CN2020/134997, filed on Dec. 9, 2020.

(30) Foreign Application Priority Data

Dec. 18, 2019 (CN) .......................... 201911310488.7

(51) Int. Cl.
*G06F 1/16* (2006.01)
*F16H 1/22* (2006.01)

(52) U.S. Cl.
CPC ........... *F16H 1/222* (2013.01); *G06F 1/1616* (2013.01); *G06F 1/1652* (2013.01); *G06F 1/1681* (2013.01)

(58) Field of Classification Search
CPC ...... F16H 1/222; G06F 1/1616; G06F 1/1652; G06F 1/1681; H04M 1/0268; H04M 1/022; H04M 1/0249; H04M 1/0214
See application file for complete search history.

(56) References Cited

U.S. PATENT DOCUMENTS 9,258,914 B2 * 2/2016 Koser .................... G06F 1/1633
10,037,058 B2 * 7/2018 Kato ......................... E05D 3/06
(Continued)

FOREIGN PATENT DOCUMENTS

CN 103398093 11/2013
CN 205847339 12/2016
(Continued)

OTHER PUBLICATIONS

EPO, Extended European Search Report for EP Application No. 20903594.8, Jan. 16, 2023.
(Continued)

*Primary Examiner* — Anthony M Haughton
*Assistant Examiner* — Theron S Milliser
(74) *Attorney, Agent, or Firm* — Hodgson Russ LLP (57) ABSTRACT

A foldable apparatus and an electronic device are provided. The foldable apparatus includes a rotating shaft base, two main bodies disposed at two opposite sides of the rotating shaft base, and a synchronous transmission assembly connected with the two main bodies. Each main body is provided with a rotating member rotatably connected with the rotating shaft base and a housing fixedly connected with the rotating member. Each rotating member is provided with a first bevel gear at an end. The synchronous transmission assembly includes two combined-gears rotatably connected with the rotating shaft base, each combined-gear includes a second bevel gear and a spur gear coaxial with the second bevel gear, two second bevel gears engage with two first bevel gears respectively, and two spur gears engage with each other.

20 Claims, 4 Drawing Sheets

(56) References Cited

U.S. PATENT DOCUMENTS

| | | | |
|---|---|---|---|
| 10,563,438 B1* | 2/2020 | Chen | E05D 5/10 |
| 11,093,008 B2* | 8/2021 | Hallar | E05D 11/1028 |
| 11,599,155 B2* | 3/2023 | Siddiqui | G06F 1/1618 |
| 2008/0109995 A1 | 5/2008 | Kuwajima et al. | |
| 2012/0096678 A1* | 4/2012 | Zhang | G06F 1/1681 |
| | | | 16/302 |
| 2015/0293562 A1 | 10/2015 | Nakamura et al. | |
| 2015/0305185 A1* | 10/2015 | Koser | G06F 1/1633 |
| | | | 361/679.58 |
| 2016/0010374 A1 | 1/2016 | Asu et al. | |
| 2018/0059740 A1* | 3/2018 | Kato | G06F 1/1681 |
| 2021/0096607 A1* | 4/2021 | Hallar | G06F 1/1681 |
| 2021/0325937 A1* | 10/2021 | Siddiqui | G06F 1/1679 |

FOREIGN PATENT DOCUMENTS

| | | |
|---|---|---|
| CN | 207504926 | 6/2018 |
| CN | 208686793 | 4/2019 |
| CN | 109872630 | 6/2019 |
| CN | 209029007 | 6/2019 |
| CN | 110417964 | 11/2019 |
| CN | 209731298 | 12/2019 |
| KR | 100549915 | 2/2006 |
| KR | 20150000916 | 3/2015 |

OTHER PUBLICATIONS

WIPO, International Search Report and Written Opinion for PCT/CN2020/134997, Mar. 10, 2021.

CNIPA, First Office Action for CN Application No. 201911310488.7, Aug. 21, 2020.

CNIPA, Notification to Grant Patent Right for Invention for CN Application No. 201911310488.7, Jan. 15, 2021.

\* cited by examiner

FOLDABLE APPARATUS AND ELECTRONIC DEVICE

CROSS-REFERENCE TO RELATED APPLICATIONS

This application is a continuation application of International Application No. PCT/CN2020/134997, filed on Dec. 9, 2020, which claims priority to Chinese Patent Application No. 201911310488.7 filed on Dec. 18, 2019, the entire disclosure of which are incorporated herein by reference.

TECHNICAL FIELD

This disclosure relates to the field of communication devices, and in particular to a foldable apparatus and an electronic device.

BACKGROUND

At present, in a foldable mobile phone, a synchronous transmission gearset is used to drive main-body parts at two sides of the foldable mobile phone to rotate relative to each other, and then drive two opposite parts of a flexible display screen to fold or unfold relative to each other. However, multiple gears of the synchronous transmission gearset are in the same rotation plane and gear moment tolerances of multiple gears are relatively large, which will lead to a phenomenon of gear rotation lag, thus affecting synchronous rotation effect of the main-body parts at two sides of the foldable mobile phone.

SUMMARY

A foldable apparatus is provided in implementations of the present disclosure, where the foldable apparatus includes a rotating shaft base, two main bodies disposed at two opposite sides of the rotating shaft base, and a synchronous transmission assembly connected with the two main bodies. Each main body is provided with a rotating member rotatably connected with the rotating shaft base and a housing fixedly connected with the rotating member, and two rotating members drive two housings to unfold or fold relative to each other respectively. Each rotating member is provided with a first bevel gear at an end, the first bevel gear is rotatably connected with the rotating shaft base. A rotating shaft of the first bevel gear is coaxial with a rotating shaft through which the rotating member is rotatably connected with the rotating shaft base. The synchronous transmission assembly includes two combined-gears rotatably connected with the rotating shaft base, each combined-gear includes a second bevel gear and a spur gear coaxial with the second bevel gear, two second bevel gears engage with two first bevel gears respectively, and two spur gears engage with each other.

An electronic device is provided in implementations of the present disclosure, where the electronic device includes a foldable apparatus and a flexible display screen. The foldable apparatus includes a rotating shaft base, two main bodies disposed at two opposite sides of the rotating shaft base, and a synchronous transmission assembly connected with the two main bodies. Each main body is provided with a rotating member rotatably connected with the rotating shaft base and a housing fixedly connected with the rotating member, and two rotating members drive two housings to unfold or fold relative to each other respectively. Each rotating member is provided with a first bevel gear at an end, the first bevel gear is rotatably connected with the rotating shaft base. A rotating shaft of the first bevel gear is coaxial with a rotating shaft through which the rotating member is rotatably connected with the rotating shaft base. The synchronous transmission assembly includes two combined-gears rotatably connected with the rotating shaft base, each combined-gear includes a second bevel gear and a spur gear coaxial with the second bevel gear, two second bevel gears engage with two first bevel gears respectively, and two spur gears engage with each other. The flexible display screen includes two parts which are able to be folded or unfolded relative to each other, and the two parts are respectively fixed to the two housings and able to be folded or unfolded along with mutual rotation of the two housings.

BRIEF DESCRIPTION OF THE DRAWINGS

In order to describe technical solutions of the present disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Technical solutions of implementations of the present disclosure will be described clearly and completely, with reference to accompanying drawings in the implementations of the present disclosure.

Figure 1:
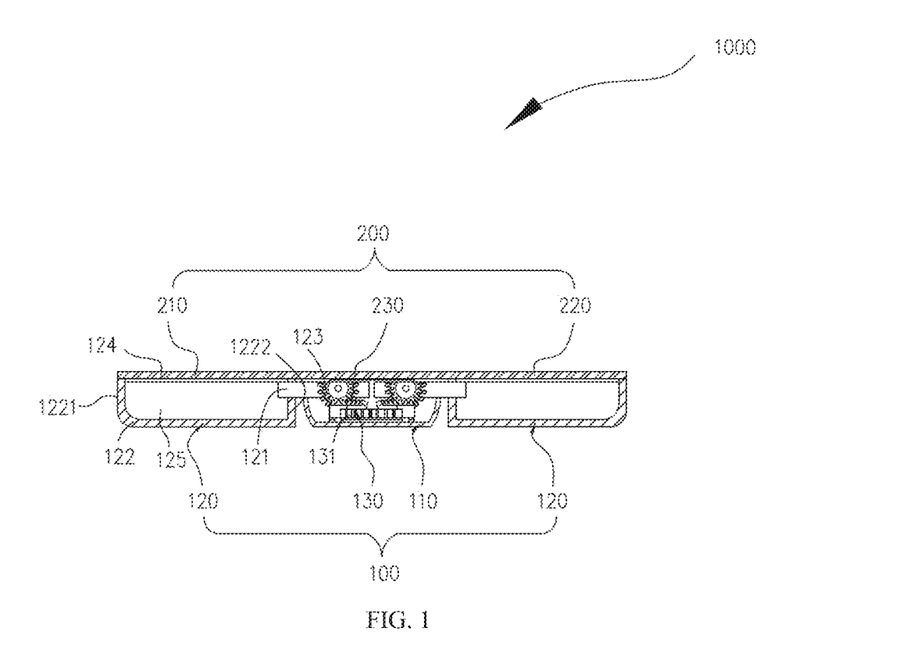
FIG. 1 is a schematic cross-sectional view of an electronic device in an unfolded state provided by implementations of the present disclosure.
Figure 2:
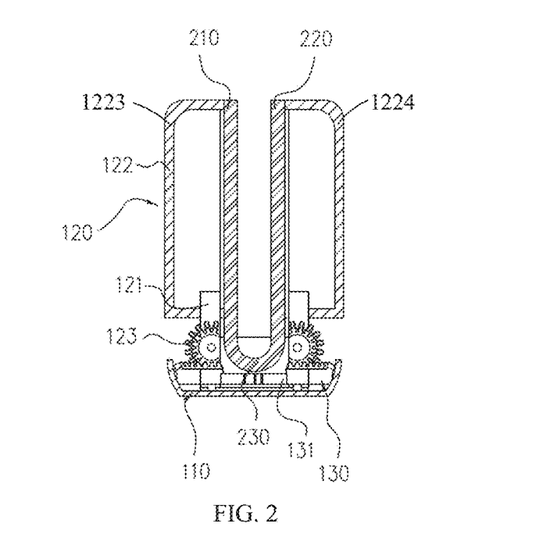
FIG. 2 is a schematic cross-sectional view of an electronic device in a folded state provided by implementations of the present disclosure.
Figure 3:
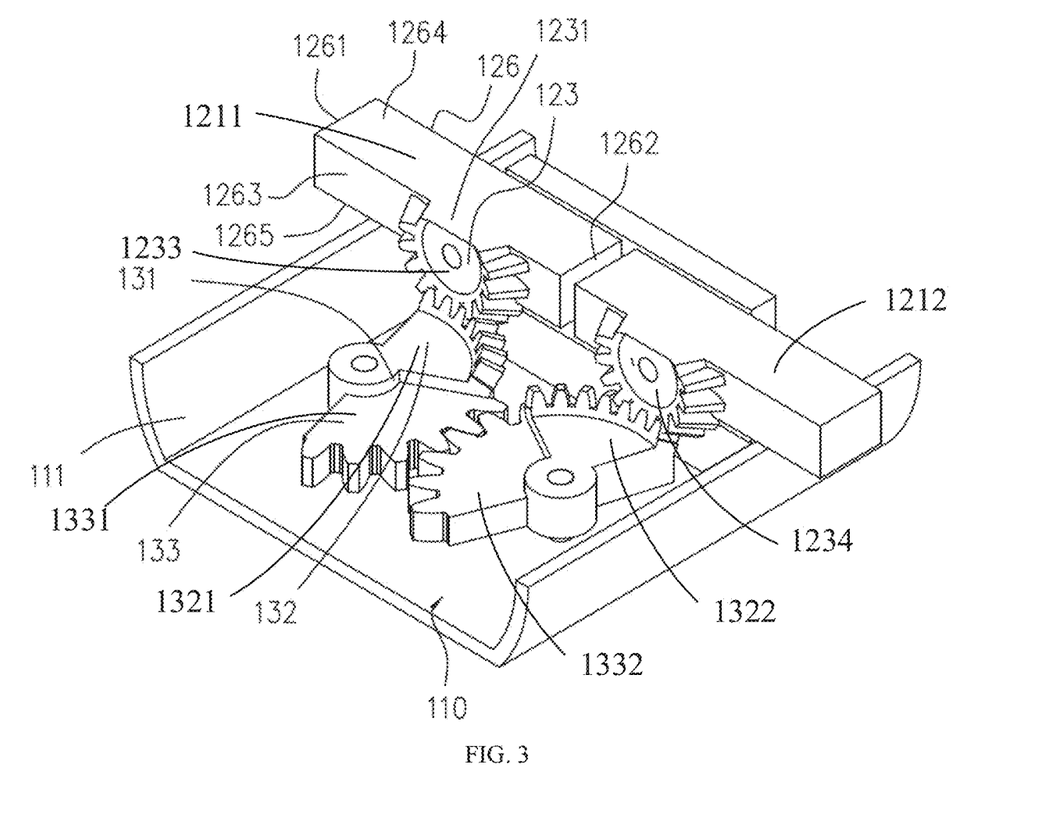
FIG. 3 is a partial three-dimensional schematic view of an electronic device provided by implementations of the present disclosure.

Reference can be made to FIG. 1, FIG. 2, and FIG. 3, an electronic device 1000 is provided in the present disclosure, and the electronic device 1000 includes a foldable apparatus 100 and a flexible display screen 200. The flexible display screen 200 includes a first part 210, a second part 220 which is folded or unfolded relative to the first part 210, and a bendable part 230 connected between the first part 210 and the second part 220. The foldable apparatus 100 includes a rotating shaft base 110, two main bodies 120 disposed at two opposite sides of the rotating shaft base 110, and a synchronous transmission assembly 130 connected with the two main bodies 120. Each main body 120 includes a rotating member 121 rotatably connected with the rotating shaft base 110 and a housing 122 fixedly connected with the rotating member 121, and two rotating members 121 drive two housings 122 to unfold or fold relative to each other respectively. The two housings 122 are fixedly connected with the first part 210 and the second part 220 respectively. Each rotating member 121 is provided with a first bevel gear 123 at an end, and the first bevel gear 123 is rotatably connected with the rotating shaft base 110. A rotating shaft of the first bevel gear 123 is coaxial with a rotating shaft through which the rotating member 121 is rotatably connected with the rotating shaft base 110. The synchronous transmission assembly 130 includes two combined-gears 131 rotatably connected with the rotating shaft base 110, each combined-gear 131 includes a second bevel gear 132 and a spur gear 133 coaxial with the second bevel gear 132, two second bevel gears 132 engage with two first bevel gears 123 respectively, and two spur gears 133 engage with each other.

It can be understood that the two main bodies 120 can carry the first part 210 and the second part 220 respectively. The two main bodies 120 rotate relative to the rotating shaft base 110, to drive the first part 210 and the second part 220 to rotate relative to the rotating shaft base 110, thus realizing that the first part 210 and the second part 220 are folded or unfolded relative to each other, such that the electronic device 1000 presents a folded state or an unfolded state. The electronic device 1000 may be a mobile phone, a tablet computer, a laptop, or other devices.

The rotating member 121 includes the first bevel gear 123, the synchronous assembly 130 includes combined-gears 131, each combined-gear 131 includes the second bevel gear 132 and the spur gear 133 coaxial with the second bevel gear 132, the two second bevel gears 132 engage with the two first bevel gears 123 respectively, and the two spur gears 133 engage with each other, such that the rotating member 121 drives a rotating member 121 at another side to synchronously rotate through the synchronous transmission assembly 130, thus the two main bodies 120 can synchronously rotate around the rotating shaft base 110, that is, the rotating member 121 and the rotating member 121 at the another side can rotate relative to the rotating shaft base 110 at the same time.

In the implementations, the housing 122 has a first edge 1221 and a second edge 1222 opposite to the first edge 1221. First edges 1221 of the two housings 122 are fixedly connected with end portions of the first part 210 and the second part 220 respectively. The second edge 1222 is adjacent to the rotating shaft base 110. The rotating member 121 is fixed to the second edge 1222 and extends perpendicular to the second edge 1222. The rotating member 121 partially protrudes relative to the housing 122. A part of the rotating member 121 protruding relative to the housing 122 extends into the rotating shaft base 110 and is rotatably connected with a combined-gear 131. The rotating member 121 of each main body 120 can be implemented as multiple rotating members 121, and the multiple rotating members 121 are arranged at regular intervals in a length direction of the second edge 1222. Each main body 120 may further include a cover plate 124 covering the housing 122. An accommodating cavity 125 is defined between the housing 122 and the cover plate 124, and a part of the rotating member 121 is accommodated in the accommodating cavity 125. The accommodating cavity 125 can also be configured to accommodate a functional component. The functional component may be a battery, a circuit board, a connector, a memory, a processor, a camera, a fingerprint module, a speaker, a receiver, etc. A surface of the cover plate 124 away from the housing 122 is smooth, such that cover plates 124 of the two main bodies 120 can support the first part 210 and the second part 220 respectively. Of course, in other implementations, the cover plates 124 of the two main bodies 120 may also be slidably connected with the first part 210 and the second part 220 respectively, to compensate for a length change of the flexible display screen 200.

In the implementations, the rotating shaft base 110 has two side plates 1122. The rotating shaft base 110 substantially forms a rotating shaft structure for the two main bodies 120, such that the two main bodies 120 can rotate relative to each other through the rotating shaft base 110. The rotating shaft base 110 is in a rectangular rod shape. A length direction of the rotating shaft base 110 is parallel to a direction of a rotating shaft of the rotating member 121. The rotating shaft base 110 defines a rotating shaft cavity 111 and the synchronous transmission assembly 130 is partially disposed in the rotating shaft cavity 111, to reduce a volume of the rotating shaft base 110. A part of the rotating member 121 away from the housing 122 can rotate into the rotating shaft cavity 111. When the two main bodies 120 drive the first part 210 and the second part 220 respectively to be in an unfolded state, the bendable part 230 is located outside the rotating shaft cavity 111, and the two rotating members 121 are located outside the rotating shaft cavity 111. When the two main bodies 120 drive the first part 210 and the second part 220 respectively to be in a folded state, an end of the rotating member 121 away from the housing 122 rotates into the rotating shaft cavity 111.

In the implementations, the rotating member 121 includes a rotating link 126, the rotating link 126 is fixedly connected with the housing 122 at one end of the rotating link 126, and the first bevel gear 123 is disposed at another end of the rotating link 126 and is rotatably connected with the first rotating shaft 114. The rotating link 126 extends perpendicular to the second edge 1222 to facilitate the rotating link 126 to rotate around the rotating shaft base 110. The rotating link 126 includes a first end 1261 fixedly connected with the housing 122 and a second end 1262 opposite to the first end 1261. The rotating link 126 is provided with the first bevel gear 123 at the second end 1262, and the first bevel gear 123 is rotatably connected with the rotating shaft base 110. The first bevel gear 123 is disposed at the second end 1262. The rotating link 126 has a side surface 1263 which is substantially perpendicular to the cover plate 124. The first bevel gear 123 is disposed at the side surface 1263. The rotating link 126 further has a top surface 1264 which is substantially parallel to the cover plate 124 and connected with the side surface 1263, and the rotating link 126 further has a bottom surface 1265 which is opposite to the top surface 1264 and connected with the side surface 1263. When the flexible display screen 200 is in an unfolded state, the top surface 1264 can support the bendable part 230. The first bevel gear 123 has a cross section 1231 flush with the top surface 1264, such that a volume of the first bevel gear 123 is reduced, thus reducing the whole volume of the rotating shaft base 110. The combined-gears 131 are completely accommodated in the rotating shaft cavity 111. The first bevel gear 123 partially protrudes relative to the bottom surface 1265, such that when the bottom surface 1265 of the rotating member 121 is substantially flush with an opening of the rotating shaft cavity 111, a part of the first bevel gear 123 can also extend into the rotating shaft cavity 111 and keep engaging with a combined-gear 131. Of course, in other implementations, the first bevel gear 123 may also be detachably connected with the rotating link 126, which facilitates detachment and maintenance of the first bevel gear 123.

In the implementations, the combined-gear 131 is rotatably connected with the rotating shaft cavity 111 at a bottom of the rotating shaft cavity 111. A second rotating shaft 115 of the combined-gear 131 is perpendicular to the first rotating shaft 114 of the first bevel gear 123. In other words, the second rotating shaft 115 of second bevel gear 132 is perpendicular to the first rotating shaft 114 of the first bevel gear 123. A rotation plane of the second bevel gear 132 is perpendicular to a rotation plane of the first bevel gear 123, and when the first bevel gear 123 engages with the second bevel gear 132, a distance between the first bevel gear 123 and the bottom of the rotating shaft cavity 111 is reduced, such that a center distance tolerance between the first bevel gear 123 and the second bevel gear 132 can be eliminated, thus avoiding idling of the first bevel gear 123 and the second bevel gear 132, and ensuring effectiveness of synchronous rotation of the two main bodies 120.

Specially, rotating members 121 include a first rotating member 1211 and a second rotating member 1212 which is opposite to the first rotating member 1211. Housings 122 include a first housing 1223 and a second housing 1224 which is opposite to the first housing 1223. First bevel gears 123 include a first first-bevel gear 1233 and a second first-bevel gear 1234 which is opposite to the first first-bevel gear 1233. Second bevel gears 132 include a first second-bevel gear 1321 and a second second-bevel gear 1322 which is opposite to the first second-bevel gear 1321. Spur gears 133 include a first spur gear 1331 and a second spur gear 1332 which is opposite to the first spur gear 1331. The first housing 1223 drives the first rotating member 1211 to rotate around the rotating shaft base 110 and drives the first part 210 of the flexible display screen 200 to rotate around the rotating shaft base 110, the first rotating member 1211 drives the first first-bevel gear 1233 to rotate, the first first-bevel gear 1233 drives the first second-bevel gear 1321 to rotate, the first second-bevel gear 1321 drives the first spur gear 1331 to rotate, the first spur gear 1331 drives the second spur gear 1332 to rotate, the second spur gear 1332 drives the second second-bevel gear 1322 to rotate, the second second-bevel gear 1322 drives the second first-bevel gear 1234 at to rotate, the second first-bevel gear 1234 drives the second rotating member 1212 to rotate, and the second rotating member 1212 drives the second housing 1224 and the second part 220 to rotate around the rotating shaft base 110, such that the first part 210 and the second part 220 synchronously rotate around the rotating shaft base 110 to be folded.

Figure 4:
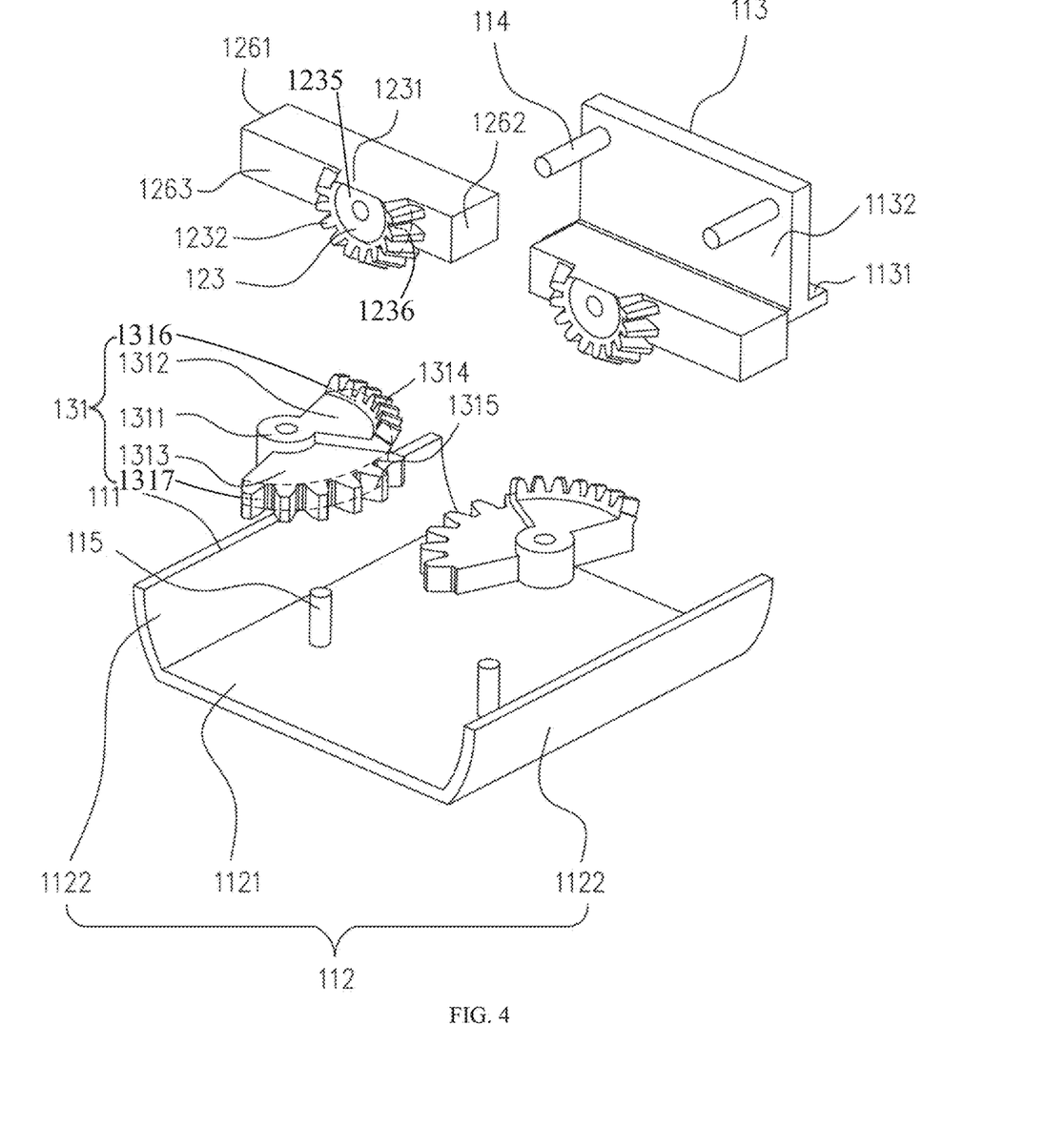
FIG. 4 is a partial three-dimensional exploded schematic view of an electronic device provided by implementations of the present disclosure.

Furthermore, reference can be made to FIG. 4, the rotating shaft base 110 includes a base 112 and a rotating shaft bracket 113 fixed to the base 112, the rotating shaft bracket 113 is provided with first rotating shafts 114 rotatably connected with rotating members 121, the base 112 is provided with second rotating shafts 115 rotatably connected with the combined-gears 131, and each first rotating shaft 114 is perpendicular to each second rotating shaft 115.

In the implementations, the base 112 defines the rotating shaft cavity 111. A bottom of the rotating shaft bracket 113 is fixed in the rotating shaft cavity 111. The first rotating shafts 114 are disposed at a part of the rotating shaft bracket 113 exposed beyond the rotating shaft cavity 111. The rotating shaft bracket 113 is provided with two first rotating shafts 114. Rotating members 121 of the two main bodies 120 are rotatably connected with the two first rotating shafts 114 respectively. The first bevel gear 123 is sleeved on the first rotating shaft 114. A rotation torque of the housing 122 rotating around the rotating shaft base 110 is transmitted to the first bevel gear 123 through the rotating link 126, such that the first bevel gear 123 rotates around the first rotating shaft 114. The second rotating shafts 115 extend from the bottom of the rotating shaft cavity 111 towards the opening of the rotating shaft cavity 111. The combined-gear 131 is sleeved on a second rotating shaft 115. A distance between the two second rotating shafts 115 is substantially equal to a sum of pitch diameters of the two spur gears 133. The first rotating shaft 114 is perpendicular to the second rotating shaft 115, such that the center distance tolerance between the first bevel gear 123 and the second bevel gear 132 is avoided. Since the second rotating shaft 115 is perpendicular to the first rotating shaft 114, a height of the synchronous transmission assembly 130 is substantially equal to a thickness of the combined-gear 131, in other words, the height of the synchronous transmission assembly 130 can be effectively reduced, and a volume of the rotating shaft base 110 can be effectively reduced.

Furthermore, the first bevel gear 123 includes a conical boss 1235 which extends parallel to the first rotating shaft 114, and the conical boss 1235 is provided with multiple first sawteeth 1232 at a first inclined side wall 1236 of the conical boss 1235.

In the implementations, the conical boss 1235 is disposed at the side surface 1263 of the rotating link 126, which is close to the second end 1262 and away from the rotating shaft bracket 113. The conical boss 1235 has the first inclined side wall 1236. The multiple first sawteeth 1232 are arranged at regular intervals at the first inclined side wall 1236. The multiple first sawteeth 1232 form sawteeth of the first bevel gear 123. The multiple first sawteeth 1232 are arranged at the first inclined side wall 1236 at a radian greater than 90°, such that the rotating member 121 can rotate at least 90° around the rotating shaft base 110, and synchronous rotation of the two main bodies 120 can be ensured. The first bevel gear 123 is formed at the side surface 1263 of the rotating link 126, such that the first bevel gear 123 is integrally disposed with the rotating link 126, an assembly tolerance between the first bevel gear 123 and the rotating link 126 is eliminated, and lag rotation of the first bevel gear 123 relative to the rotating link 126 is prevented.

Furthermore, the combined-gear 131 includes a bushing 1311, the second bevel gear 132, and the spur gear 133. The second bevel gear 132 includes a first sector 1312 fixed to a circumferential side of the bushing 1311, and the spur gear 133 includes a second sector 1313 fixed to a circumferential side of the bushing 1311. The bushing 1311 is rotatably connected with the second rotating shaft 115. The first sector 1312 has a second inclined side wall 1316 at a periphery of the first sector 1312 away from the bushing 1311 and multiple second sawteeth 1314 arranged at the second inclined side wall 1316. The second sector 1313 has a vertical wall 1317 at a periphery of the second sector 1313 away from the bushing 1311 and multiple third sawteeth 1315 arranged at the vertical wall 1317.

In the implementations, the bushing 1311 is sleeved on the second rotating shaft 115. The first sector 1312 and the second sector 1313 each extend in a direction perpendicular to the second rotating shaft 115, and the first sector 1312 and the second sector 1313 are arranged side by side in the direction perpendicular to the second rotating shaft 115. A radian of the second inclined side wall 1316 is substantially 90°. A radian of the vertical wall 1317 is substantially 90°. When the rotating member 121 rotates 90° around the rotating shaft base 110, the second bevel gear 132 can rotate 90° relative to the base 112, and the spur gear 133 can rotate 90° relative to the base 112. The first sector 1312, the second sector 1313, and the bushing 1311 are integrally disposed, such that the second bevel gear 132 and the spur gear 133 synchronously rotate relative to the base 112.

Furthermore, the base 112 has a bottom plate 1121 and two side plates 1122 fixed to two sides of the bottom plate 1121, the two side plates 1122 are adjacent to the two housings 122 respectively, the rotating shaft bracket 113 is fixed between the bottom plate 1121 and the two side plates 1122, and the second rotating shafts 115 are disposed on the bottom plate 1121. The first sector 1312 and the second sector 1313 are arranged in a direction parallel to the bottom plate 1121 side by side.

In the implementations, the rotating shaft cavity 111 is defined between the bottom plate 1121 and the two side plates 1122. The rotating shaft bracket 113 is fixed to the bottom plate 1121 at the bottom of the rotating shaft bracket 113. The rotating shaft bracket 113 includes a bearing bottom plate 1131 and a bearing vertical plate 1132 perpendicularly fixed to the bearing bottom plate 1131. The first rotating shafts 114 are disposed on the bearing vertical plate 1132 and extend perpendicular to the bearing vertical plate 1132, that is, extend parallel to the bearing bottom plate 1131. The bearing bottom plate 1131 is attached to the bottom plate 1121. The second rotating shafts 115 extend perpendicular to the bottom plate 1121. The combined-gears 131 each are spaced apart from the bearing bottom plate 1131 on the bottom plate 1121. The bearing vertical 1132 is spaced apart from side plates 1122 to ensure a parallelism between a plane where a connection line between the two first rotating shafts 114 is located and the bottom plate 1121, that is, to ensure that distances between the two first rotating shafts 114 each and the bottom plate 1121 are the same, thus ensuring synchronous transmission efficiency of the synchronous transmission assembly 130. The side plates 1122 and the bottom plate 1121 can protect the synchronous transmission assembly 130 and the rotating shaft bracket 113.

In the implementations, the first rotating shafts 114 are substantially located at places of the bearing vertical plate 1132 flush with the opening of the rotating shaft cavity 111, such that edges of the side plates 1122 away from the bottom plate 1121 can limit rotation of the rotating members 121. Specifically, when rotating links 126 rotate to a state where the rotating links 126 are in contact with the edges of the side plates 1122 away from the bottom plate 1121, two rotating links 126 are substantially flush and drive the two housings 122 to unfold relative to each other, such that the first part 210 and the second part 220 are unfolded, that is, the flexible display screen 200 is in an unfolded state, the side plates 1122 limit the rotating members 121 to continually rotate away from the bottom plate 1121, that is, limit continuous rotation of the two housings 122, thus prevent the flexible display screen 200 from being pulled apart. The rotating shaft cavity 111 can accommodate ends of the rotating links 126 away from the housings 122. When the flexible display screen 200 is in an unfolded state, second ends 1262 of the two rotating links 126 are spliced with each other. When the flexible display screen 200 is in a folded state, the two housings 122 are folded relative to each other, the second ends 1262 of the two rotating links 126 each are accommodated in the rotating shaft cavity 111 and close to the bottom plate 1121, thus ensuring that the rotating shaft cavity 111 can accommodate a part of the bendable part 230.

Figure 5:
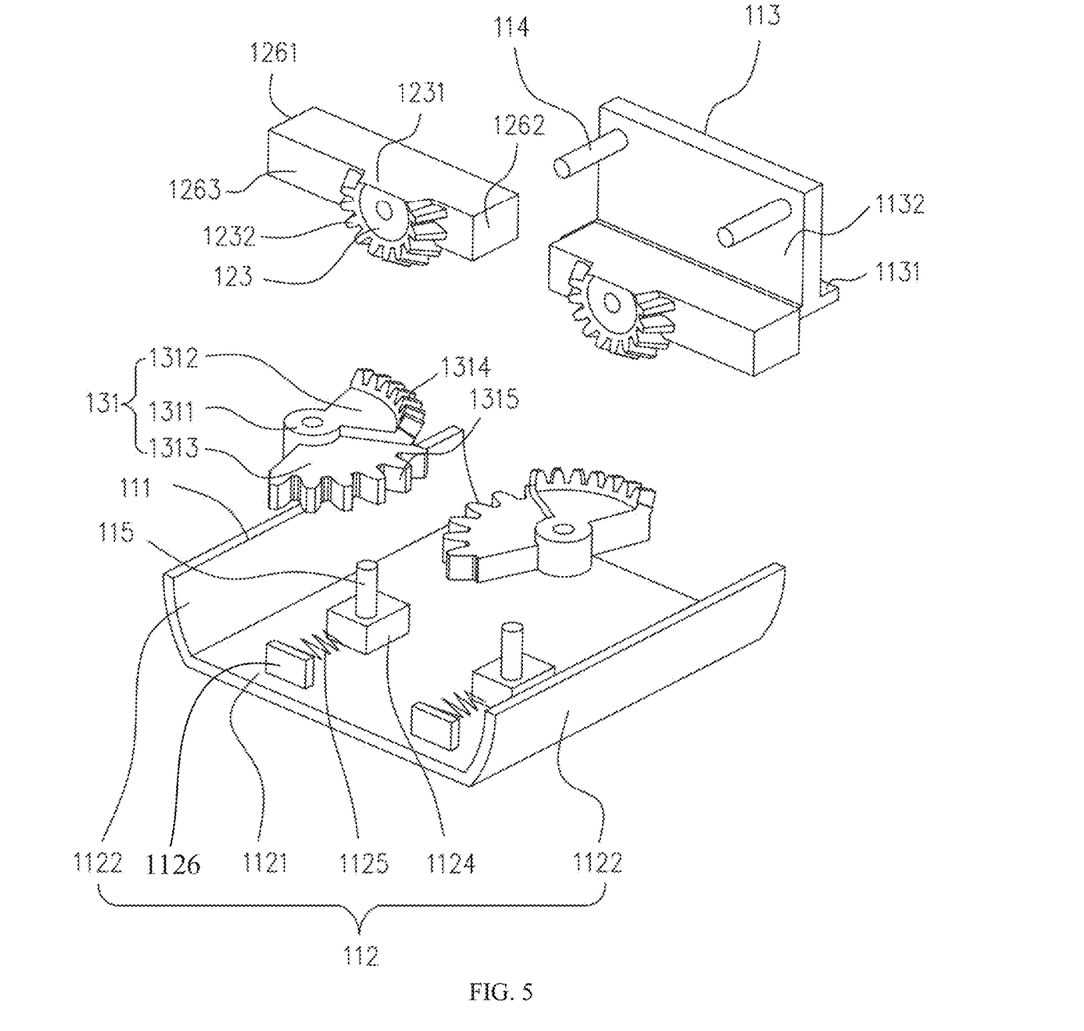
FIG. 5 is a partial three-dimensional exploded schematic view of an electronic device provided by other implementations of the present disclosure.

In other implementations, reference can be made to FIG. 5, which is substantially the same as the implementations illustrated in FIG. 4, except that the second rotating shafts 115 may also be slidably disposed at the bottom plate 1121. Specifically, the base 112 further includes sliding blocks 1124, elastic members 1125, and vertical plates 1126. Each vertical plate 1126 is perpendicularly fixed to the bottom plate 1121, each sliding block 1124 is slidably connected with the bottom plate 1121, and each elastic member 1125 is elastically compressed between each sliding block 1124 and each vertical plate 1126. A sliding direction of a sliding block 1124 is parallel to the length direction of the rotating shaft base 110. An elastic member 1125 is configured to provide an elastic restoring force of the sliding block 1124 sliding towards the rotating shaft bracket 113. The second rotating shaft 115 is disposed on the sliding block 1124. The second rotating shaft 115 extends perpendicular to the bottom plate 1121. The sliding block 1124 can drive the second bevel gear 132 of the combined-gear 131 to move closer towards the rotating shaft bracket 113, such that the second bevel gear 132 abuts against the first bevel gear 123 in a direction parallel to the first rotating shaft 114. In other words, fit tightness of the first bevel gear 123 and the second bevel gear 132 is improved, fit clearance of the first bevel gear 123 and the second bevel gear is reduced, and synchronous rotation efficiency of the first bevel gear 123 and the second bevel gear 132 is improved.

In the foldable apparatus 100 and the electronic device 1000 provided in the implementations of the present disclosure, the rotating member 121 includes the first bevel gear 123, the synchronous transmission assembly 130 includes the combined-gears 131, each combined-gear 131 includes the second bevel gear 132 and the spur gear 133 coaxial with the second bevel gear 132, the two second bevel gears 132 engage with the two first bevel gears 123 respectively, and the two spur gears 133 engage with each other, such that the rotating member 121 drive drives a rotating member 121 at another side to synchronously rotate through the synchronous transmission assembly 130, thus the two main bodies 120 can synchronously rotate around the rotating shaft base 110.

The above are the preferable implementations of the present disclosure. It should be noted that, for those of ordinary skill in the art, without departing from a concept of the present disclosure, several modifications and improvements can be made, and these modifications and improvements are also regard as the protection scope of the present disclosure.

What is claimed is:

1. A foldable apparatus, comprising:
a rotating shaft base;
two main bodies disposed at two opposite sides of the rotating shaft base; and
a synchronous transmission assembly connected with the two main bodies, wherein each main body is provided with a rotating member rotatably connected with the rotating shaft base and a housing fixedly connected with the rotating member, two rotating members drive two housings to unfold or fold relative to each other respectively, each rotating member is provided with a first bevel gear at an end, the first bevel gear is rotatably connected with the rotating shaft base, a rotating shaft of the first bevel gear is coaxial with a rotating shaft through which the rotating member is rotatably connected with the rotating shaft base, the synchronous transmission assembly comprises two combined-gears rotatably connected with the rotating shaft base, each combined-gear comprises a second bevel gear and a spur gear coaxial with the second bevel gear, two second bevel gears engage with two first bevel gears respectively, and two spur gears engage with each other.

2. The foldable apparatus of claim 1, wherein the housing has a first edge and a second edge opposite to the first edge, first edges of the two housings are configured to be fixedly connected with two end portions of a flexible display screen respectively, and the second edge is adjacent to the rotating shaft base.

3. The foldable apparatus of claim 2, wherein the rotating member is fixed to the second edge and extends perpendicular to the second edge, the rotating member partially protrudes relative to the housing, and a part of the rotating member protruding relative to the housing extends into the rotating shaft base and is rotatably connected with a combined-gear.

4. The foldable apparatus of claim 2, wherein the rotating member of each main body is implemented as a plurality of rotating members, and the plurality of rotating members are arranged at intervals in a length direction of the second edge.

5. The foldable apparatus of claim 2, wherein each main body further comprises a cover plate covering the housing, the cover plate is configured to support the flexible display screen, an accommodating cavity is defined between the housing and the cover plate, and a part of the rotating member is accommodated in the accommodating cavity.

6. The foldable apparatus of claim 1, wherein the rotating shaft base comprises a base and a rotating shaft bracket fixed to the base, the rotating shaft bracket is provided with first rotating shafts rotatably connected with rotating members, the base is provided with second rotating shafts rotatably connected with combined-gears, and each first rotating shaft is perpendicular to each second rotating shaft.

7. The foldable apparatus of claim 6, wherein the base defines a rotating shaft cavity, a bottom of the rotating shaft bracket is fixed in the rotating shaft cavity, and the first rotating shafts are disposed at a part of the rotating shaft bracket exposed beyond the rotating shaft cavity.

8. The foldable apparatus of claim 6, wherein the rotating shaft bracket is provided with two first rotating shafts, rotating members of the two main bodies are rotatably connected with the two first rotating shafts respectively.

9. The foldable apparatus of claim 6, wherein the first bevel gear is sleeved on the first rotating shaft.

10. The foldable apparatus of claim 7, wherein the second rotating shafts extend from a bottom of the rotating shaft cavity towards an opening of the rotating shaft cavity, and each combined-gear is sleeved on each second rotating shaft.

11. The foldable apparatus of claim 6, wherein the rotating member comprises a rotating link, the rotating link is fixedly connected with the housing at one end of the rotating link, and the first bevel gear is disposed at another end of the rotating link and is rotatably connected with the first rotating shaft.

12. The foldable apparatus of claim 11, wherein the first bevel gear comprises a conical boss which extends parallel to the first rotating shaft, and the conical boss is provided with a plurality of first sawteeth at a first inclined side wall of the conical boss.

13. The foldable apparatus of claim 12, wherein the plurality of first sawteeth are arranged at the first inclined side wall of the conical boss at a radian greater than 90°.

14. The foldable apparatus of claim 6, wherein a combined-gear comprises a bushing, the second bevel gear, and the spur gear, the second bevel gear comprises a first sector fixed to a circumferential side of the bushing, and the spur gear comprises a second sector fixed to a circumferential side of the bushing;

wherein the bushing is rotatably connected with the second rotating shaft;

wherein the first sector has a second inclined side wall at a periphery of the first sector away from the bushing and a plurality of second sawteeth arranged at the second inclined side wall; and wherein the second sector has a vertical wall at a periphery of the second sector away from the bushing and a plurality of third sawteeth arranged at the vertical wall.

15. The foldable apparatus of claim 14, wherein a radian of the second inclined side wall is substantially 90° and a radian of the vertical wall is substantially 90°.

16. The foldable apparatus of claim 6, wherein the base has a bottom plate and two side plates fixed to two sides of the bottom plate, the two side plates are adjacent to the two housings respectively, the rotating shaft bracket is fixed between the bottom plate and the two side plates, and the second rotating shafts are disposed on the bottom plate.

17. The foldable apparatus of claim 16, wherein the rotating shaft bracket comprises a bearing bottom plate and a bearing vertical plate perpendicularly fixed to the bearing bottom plate, the first rotating shafts are disposed on the bearing vertical plate and extend perpendicular to the bearing vertical plate, and the bearing bottom plate is attached to the bottom plate.

18. The foldable apparatus of claim 16, wherein the two housings are unfolded relative to each other, when the two rotating members rotate to a state where the two rotating members are in contact with edges of side plates away from the bottom plate.

19. The foldable apparatus of claim 16, wherein the two housings are folded relative to each other, when ends of the two rotating members away from housings rotates to be close to the bottom plate.

20. An electronic device, comprising:
a foldable apparatus, comprising:
a rotating shaft base;
two main bodies disposed at two opposite sides of the rotating shaft base; and
a synchronous transmission assembly connected with the two main bodies, wherein each main body is provided with a rotating member rotatably connected with the rotating shaft base and a housing fixedly connected with the rotating member, two rotating members drive two housings to unfold or fold relative to each other respectively, each rotating member is provided with a first bevel gear at an end, the first bevel gear is rotatably connected with the rotating shaft base, a rotating shaft of the first bevel gear is coaxial with a rotating shaft through which the rotating member is rotatably connected with the rotating shaft base, the synchronous transmission assembly comprises two combined-gears rotatably connected with the rotating shaft base, each combined-gear comprises a second bevel gear and a spur gear coaxial with the second bevel gear, two second bevel gears engage with two first bevel gears respectively, and two spur gears engage with each other; and
a flexible display screen, wherein the flexible display screen comprises two parts which are able to be folded or unfolded relative to each other, and the two parts are respectively fixed to the two housings and able to be folded or unfolded along with mutual rotation of the two housings.

* * * * *